(12) United States Patent
Heath et al.

(10) Patent No.: US 9,209,981 B2
(45) Date of Patent: Dec. 8, 2015

(54) POWER OVER ETHERNET ON DATA PAIRS AND SPARE PAIRS

(71) Applicant: Linear Technology Corporation, Milpitas, CA (US)

(72) Inventors: Jeffrey Lynn Heath, Santa Barbara, CA (US); David Dwelley, Santa Barbara, CA (US); Heath Dixon Stewart, Santa Barbara, CA (US); Michael Thomas Paul, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 219 days.

(21) Appl. No.: 14/150,150

(22) Filed: Jan. 8, 2014

(65) Prior Publication Data

US 2014/0372773 A1 Dec. 18, 2014

Related U.S. Application Data

(60) Provisional application No. 61/836,399, filed on Jun. 18, 2013.

(51) Int. Cl.
*G06F 1/26* (2006.01)
*H04L 12/10* (2006.01)
*H04L 12/40* (2006.01)
*H04L 25/02* (2006.01)
*H04L 12/931* (2013.01)

(52) U.S. Cl.
CPC *H04L 12/10* (2013.01); *G06F 1/26* (2013.01); *G06F 1/266* (2013.01); *H04L 12/40045* (2013.01); *H04L 25/0272* (2013.01); *H04L 49/40* (2013.01)

(58) Field of Classification Search
CPC ........... G06F 1/26; G06F 1/266; H04L 12/10; H04L 12/40045; H04L 25/0272; H04L 49/40
See application file for complete search history.

(56) References Cited

U.S. PATENT DOCUMENTS 7,535,830 B2 * 5/2009 Cromer ............... H04L 12/5692
370/227
7,856,561 B2 * 12/2010 Stineman, Jr. .......... H04L 12/10
324/600

FOREIGN PATENT DOCUMENTS

EP 2587718 A1 5/2013
WO 2006088745 A2 8/2006

OTHER PUBLICATIONS

EP Application No. 14002012.4, "Extended EP Search Report," Nov. 13, 2014.

*Primary Examiner* — Thuan Du
(74) *Attorney, Agent, or Firm* — Patent Law Group LLP; Brian D. Ogonowsky (57) ABSTRACT

Power Sourcing Equipment (PSE) provides a PoE supply voltage over data wires to a Powered Device (PD). A PSE controller controls a first FET that couples the PoE voltage to the data wire pairs and controls a second FET that couples the data wire pairs to the spare wire pairs. Upon powering up, the PSE controller keeps the two FETs open and performs a detection routine on any devices connected to the data pairs and spare pairs. If a PoE-compatible PD is detected as being coupled to the data pairs, the first switch is closed. If it is determined that the PoE voltage should also be coupled to the spare pairs, the second FET is also closed. The method prevents the PoE voltage from being applied to the spare pairs when the device connected to the spare pairs is not PoE compatible and maintains backwards compliance with IEEE PoE PDs.

17 Claims, 4 Drawing Sheets

POWER OVER ETHERNET ON DATA PAIRS AND SPARE PAIRS

CROSS-REFERENCE TO RELATED APPLICATIONS

This application is based on and claims priority from U.S. Provisional Application Ser. No. 61/836,399, filed Jun. 18, 2013, by Jeffrey Lynn Heath et al., incorporated herein by reference.

FIELD OF THE INVENTION

This invention relates to Power Over Ethernet (PoE) systems, where power is transmitted over twisted data wire pairs and twisted spare wire pairs.

BACKGROUND

It is known to transmit power over data lines to power remote equipment. Power Over Ethernet (PoE) is an example of one such system. In PoE, limited power is transmitted to Ethernet-connected equipment (e.g., VoIP telephones, WLAN transmitters, security cameras, etc.) from an Ethernet switch. Typically, DC power from the switch is transmitted over two sets of twisted pair wires in the standard CAT-5 cabling. The same two sets of twisted pair wires may also transmit differential data signals, since the DC common mode voltage does not affect the data. In this way, the need for providing any external power source for the "Powered Devices" (PDs) can be eliminated. The standards for PoE are set out in IEEE 802.3, incorporated herein by reference.

The Ethernet standards specify that there be a first and second pair of twisted wires designated as data pairs and a third and fourth pair of twisted wires designated as spare pairs. The spare pairs are typically not used for PDs that do not require more than the IEEE power limit of 25.5 W. "Power Sourcing Equipment" (PSE) may be any Ethernet device that supplies power to a PD over the data lines. The PSE and PD are typically connected via a standard CAT-5 cable terminated with the standard Ethernet 8-pin (four twisted pairs) connector.

However, PDs are known to exist which require more than the 25.5 W IEEE limit. To minimize PoE power losses along the CAT-5 cable, it is known to connect the data and spare pairs in parallel at both the PSE end and the PD end to reduce resistive losses in the cable. This is shown in FIG. 1.

Figure 1:
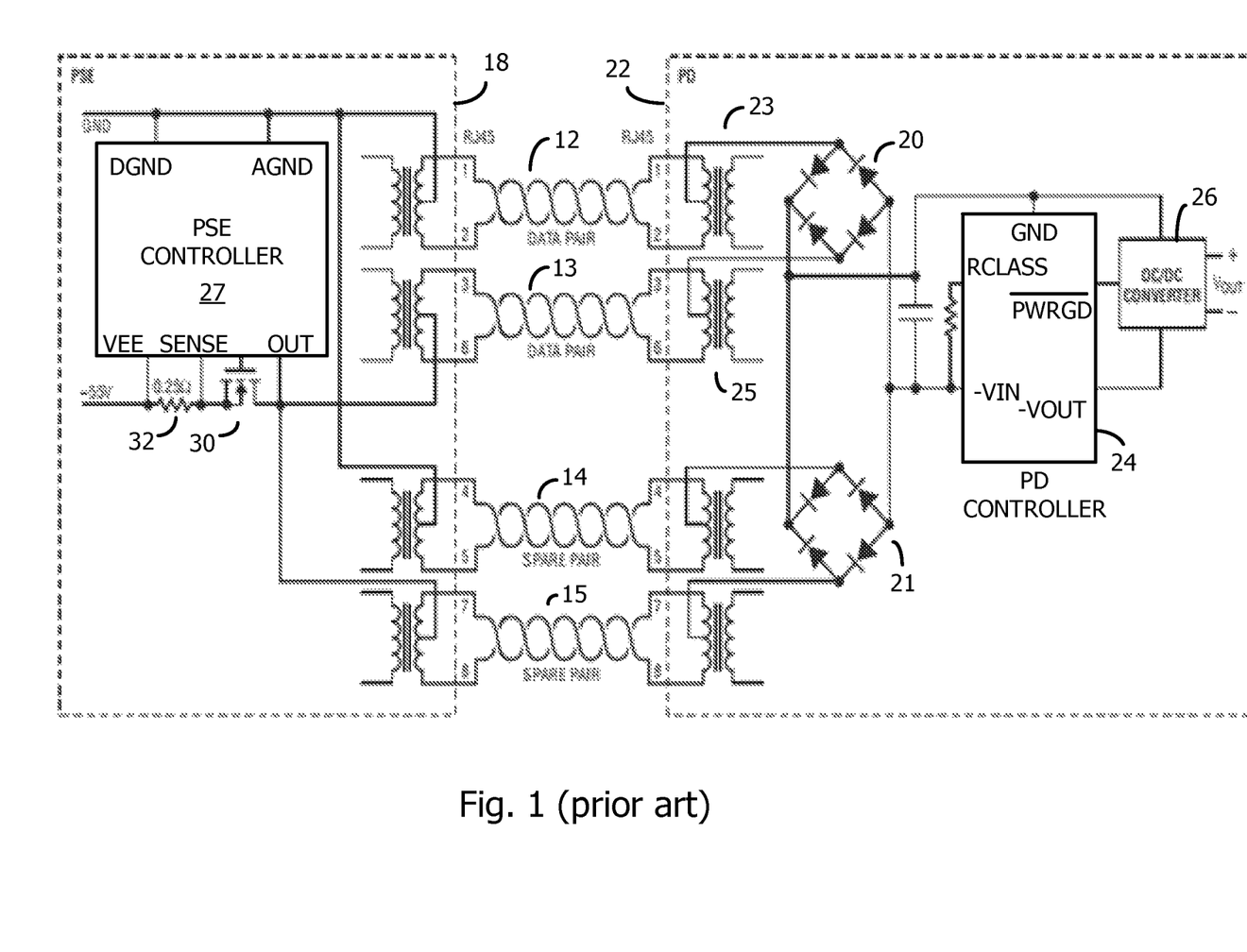
FIG. 1 illustrates a non-conventional prior art PoE-enabled Ethernet system using data pairs and spare pairs hard-wired together to supply PoE voltage to the PD, typically to supply greater than 25.5 W to the PD.

FIG. 1 represents an Ethernet system using PoE, where the data pairs 12 and 13 in the CAT-5 cable are hard-wired to the spare pairs 14 and 15 in the PSE 18 to conduct the PoE current in parallel along the two paths. This presently violates the IEEE standards for PoE but is done by various users. Since the term "PoE" is sometimes used to identify a system in accordance with the IEEE standards, the system of FIG. 1 may be referred to as ">25.5 W PoE." The pairs are applied to respective diode bridges 20 and 21 in the PD 22 to combine the currents at the ground and −VIN terminals of a PD controller 24. Although the PoE supply voltage is shown as −55V, the supply voltage can be other values, depending on the system. Since each set of pairs is guaranteed to carry power up to 25.5 W, the combination of the pairs can safely carry higher power if the PD 22 requires it and reduces the IR drop.

The PSE 18 is typically powered by the mains voltage (120 VAC) and uses either an external or internal voltage converter to generate a DC voltage between 44-57 volts. The PoE standards require the PoE to supply a minimum of 37 volts at the PD. The voltage drop along the cable increases with distance.

All pairs in use are terminated at the PD 22 by transformers, such as transformers 23 and 25. It is assumed that the twisted pairs 13 and 15 provide 44 volts and the twisted pairs 12 and 14 are connected to ground. A connection is made to the center tap of the transformers to provide the approximately 44 volts to the PD controller 24. Since the DC voltage is common mode, it does not affect the differential data.

The 44 volts is applied to a DC-DC converter 26 for converting the voltage to any voltage or voltages required by the PD load. The load (e.g., a security camera) is powered by the converter 26 and may communicate with the PSE 18 and any other equipment via the twisted wire pairs.

The IEEE standards require certain low current handshaking procedures between the PSE 18 and PD 22 in order to detect the presence of a PoE-powered device and in order to convey the pertinent characteristics of the PSE 18 and PD 22 prior to the PSE 18 making the full power available to the PD 22.

Below is a simplified summary of the standard handshaking protocol between the PSE 18 and the PD 22.

When a PoE-enabled Ethernet cable is plugged into the PD 22, the PSE controller 27 interrogates the PD 22 to determine if it is PoE-compatible. This period is termed the detection phase. During the detection phase, the PSE controller 27 applies a first voltage-limited current for a fixed interval to the PD 22, via the twisted wire pairs 12 and 13, and then applies a second voltage-limited current for a fixed interval, while looking for a characteristic impedance of the PD 22 (about 25K ohms) by detecting the resulting voltage. If the correct impedance is not detected, the PSE 18 assumes that the load is not PoE-compatible and does not use the PoE capability. The system then operates as a standard Ethernet connection.

If the signature impedance is detected, the PSE controller 27 moves on to an optional classification phase. The PSE controller 27 ramps up the voltage to the PD 22. The PSE controller 27 generates either one pulse (indicating it is a Type 1 PSE) or two pulses (indicating it is a Type 2 PSE). The PD 22 responds to the classification pulses with certain current levels to identify whether the PD 22 is Type 1 or Type 2. A Type 1 PD requires less than 13 W. A Type 2 PD requires up to a maximum of 25.5 W. Various classes (e.g., five classes), each associated with a maximum average current level and a maximum instantaneous current level, within these types may also be identified. A classification resistor may be used, as shown in FIG. 1 connected to the RCLASS pin of the PD controller 24. The PSE controller 27 then may use this power demand information to determine if it can supply the required power to the PD 22, and the PD 22 uses the information to determine if it can fully operate with the PSE 18. There are maximum time windows for the detection and classification phases (e.g., 500 ms).

For higher power equipment, a high power class is designated, which allows the PSE 18 to provide over 25.5 W to the PD 22. With such a high power class, it is recommended to tie the data pairs and the spare pairs together to share the current.

Other types of detection and classification routines and standards may be implemented in the future.

On completion of the detection and classification phases, the PSE controller 27 ramps the PoE output voltage above 42 V, and the FET 30 is closed to directly connect the full PoE voltage to the PD 22. Once an under-voltage lockout (UVLO) threshold has been detected at the PD 22, an internal FET is turned on to create a "Power Good" signal for enabling the DC-DC converter 26. At this point, the PD 22 begins to operate normally, and it continues to operate normally as long as the input voltage remains above a required level.

A low value sense resistor 32 is connected in series with the current path, and its voltage drop is detected by the PSE controller 27. The PSE controller 27 uses the sensed signal to: 1) detect if the PD 22 has become disconnected; 2) detect the actual current through the sense resistor for reporting purposes; 3) detect an overcurrent situation for reporting purposes; and 4) detect whether the PD 22 has reached a hard-stop current limit, which limits the current through the FET 30. The current flags depend on the classification of the PD 22. If ceasing power to the PD 22 is required, the PSE controller 27 turns off the FET 30.

Data may be transmitted over the data pairs and spare pairs using conventional means, such as connecting the transceivers of other devices to the differential terminals of the data pairs' transformers and spare pairs' transformers.

Figures 2, 3:
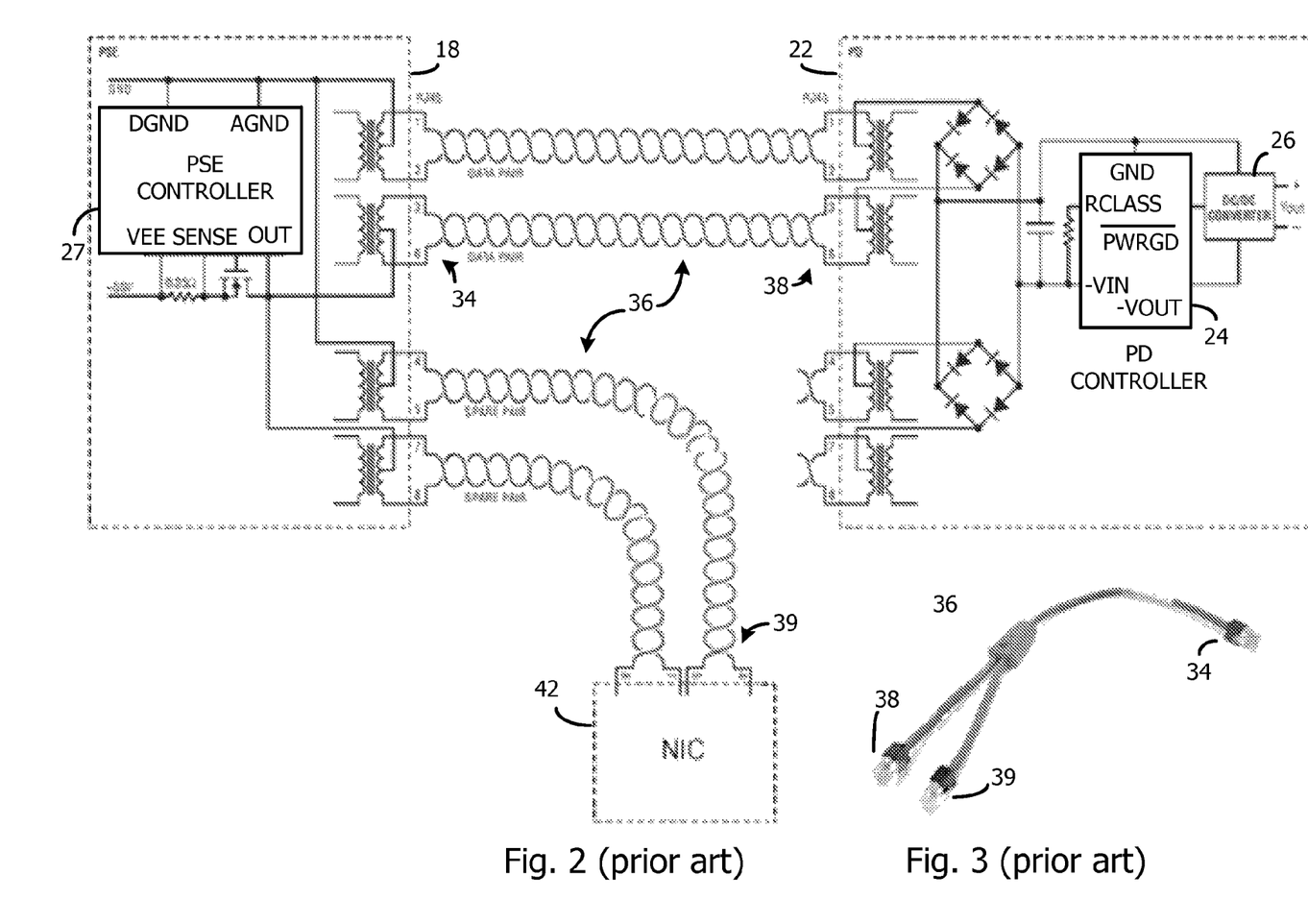
FIG. 2 illustrates the system of FIG. 1 where a user uses a Y-cable to incorrectly connect a non-PoE powered device to the spare pairs, while a PoE powered device is connected to the data pairs, resulting in possible damage to the non-PoE powered device.
FIG. 3 illustrates a conventional Y-cable for Ethernet for splitting out the data pairs and the spare pairs.

Since the designer of the PSE 18 may not be in control of what devices are connected to the PSE 18, the PSE 18 may be used incorrectly by the user, resulting in damage to the equipment. FIG. 2 illustrates one possible configuration that may result in damage to the equipment.

In FIG. 2, the user has decided to connect one end 34 of a Y-cable 36, shown in FIG. 3, to the 8-pin CAT-5 socket of the PSE 18. The other end of the Y-cable 36 splits into a data pairs end 38 and a spare pairs end 39. The end 39 is shown connected to a CAT-5 socket of a network interface controller (NIC) 42, which is a device arbitrarily selected for the example. The NIC 42 is not configured to use PoE. However, the PD 22 has indicated to the PSE 18 during the detection and classification phase that the PSE 18 should provide the 44 volts on the data pairs and spare pairs. Therefore, the NIC 42 may become damaged and/or the system will shut down due to a flag being raised.

Although such problems may be avoided by providing a separate PSE and CAT-5 cable for the PD 22 and the NIC 42 (or any other equipment), so that an independent detection and classification routine would be performed on each device, such a configuration adds cost and size to the system.

What is needed is a single PSE controller in a PoE system that can either: 1) supply power identically to both the data pairs and spare pairs; 2) or supply power only to the data pairs; or 3) provide no PoE to either pair, where the PSE controller ensures that no PoE voltage will be supplied to a non-PoE compatible device connected to either the data pairs or the spare pairs.

SUMMARY

A PSE controller is described having two, independently controllable output ports, where the first output port (OUT1) is connected to the data pairs, and the second output port (OUT2) is connected to the spare pairs, with a common ground. A first FET selectively connects the full PoE voltage to the data pairs during normal operation, after the detection and classification phase. Prior to the detection and classification phase, the PSE controller controls a second FET (or other type of switch) to isolate the data pairs from the spare pairs, which also isolates the OUT1 from the OUT2. The PSE controller is capable of then independently and/or concurrently performing detection and classification over the data pairs and the spare pairs using the OUT1 and OUT2.

If the results of the detection and classification phase show that PoE should be supplied to only the data pairs and not to the spare pairs, the second FET remains off so the data pairs remain isolated from the spare pairs, and PoE voltage is only supplied to the data pairs. Both pairs can still transmit/receive data via the conventional means.

If the detection and classification phase reveals that a single PD is connected to both the data pairs and the spare pairs, and the PD is classified as a high power PD (requires >25.5 W), the second FET is turned on to connect the data pairs to the spare pairs, and the PoE voltage is applied to both sets of pairs so the power is shared equally by the two sets of pairs to reduce resistive losses.

The present IEEE standards for PoE preclude the data pairs and spare pairs being shorted together for supplying PoE though the two sets of pairs; however, the present invention enables the data pairs and spare pairs being shorted together by the second FET for supplying PoE voltage though the two sets of pairs. The IEEE standards for PoE may be changed in the future to include such a scenario.

If the detection and classification phase reveals that a single PD is connected to both the data pairs and the spare pairs, and the PD is classified as a standard power PD (requires <25.5 W), the second FET may be turned on to connect the data pairs to the spare pairs, so the power is shared equally by the two sets of pairs. However, if the IEEE standards are required to be met, the second FET must remain off.

If the detection and classification phase reveals the PoE requirements are the same for different PDs connected to the data pairs and spare pairs, or if the PDs have compatible classes, the second FET may be turned on, in violation of the present IEEE standards, to allow PoE voltage to be provided to the data pairs and the spare pairs. However, if the IEEE standards are to be met, the second FET must remain off, so the PD connected to the spare pairs will not receive PoE.

After a detection and classification phase indicates that at least the data pairs are to be provided PoE, full PoE power is then supplied by means of the PSE controller closing the first FET that connects the data pairs to the PoE voltage source (e.g., providing 55 volts). Therefore, the PSE controller is bypassed when the PSE voltage source supplies full power to the data pairs, and the second FET (also controlled by the PSE controller) determines whether the spare pairs are to be connected to the data pairs.

In all instances, power will not be supplied to any device connected to either the data pairs or the spare pairs unless that device is detected as being PoE-compatible during the detection and classification phase.

Instead of the conventional technique of supplying two voltages to the PD over the pairs to detect the characteristic impedance (25K ohms) by measuring the resulting currents, the detection is performed by supplying a known low first current on a set of pairs and detecting the resulting voltage, then changing the current to a known second current and detecting the delta voltage. The two-point fixed current method allows the PD signature resistance to be isolated from any static diode voltage drops in the PD.

A variation of this detection method can be used to simultaneously detect if a single PD is connected to both the data pairs and spare pairs. While the second FET is off, the PSE controller supplies a known first current to the data pairs (via OUT1) and measures the resulting voltage. While the first current is being applied to the data pairs, a known second current is supplied to the spare pairs (via OUT2), and the resulting voltage is detected. If the data pairs and spare pairs are connected at the PD, the sum of the currents supplied to the data pairs and spare pairs will flow through any 25K ohm resistor in the PD. If the detection of the two voltages at the two current levels indicates that the 25K ohm resistance is present, it signifies that there is only one PD coupled to the data pairs and the spare pairs and that it is PoE-compatible. The classification phase is then performed for the single PD.

If the above detection technique indicates that the data pairs and the spare pairs are not connected to the same PD, the full detection and classification routines are independently performed for the data pairs (via OUT1) and the spare pairs (via OUT2).

Besides the PSE controller performing the functions of detection, classification, and opening and closing the first FET and second FET, the PSE controller also detects the current into the PD by detecting the voltage across a low value sense resistor. The PSE controller then performs the functions of reporting the current, detecting a disconnect of the PD, detecting an overcurrent, and limiting the maximum current by controlling the conductivity of the first FET.

Differential digital data may be transmitted over the data pairs and spare pairs using conventional means, such as connecting the transceivers of the data-related devices to the differential terminals of the transformers for the data pairs and the spare pairs. Such data communication methods and structures are not affected by the present invention, which is concerned only with PoE.

Various other embodiments are described.

BRIEF DESCRIPTION OF THE DRAWINGS

Elements that are the same or equivalent are labeled with the same numeral.

DETAILED DESCRIPTION

Figure 4:
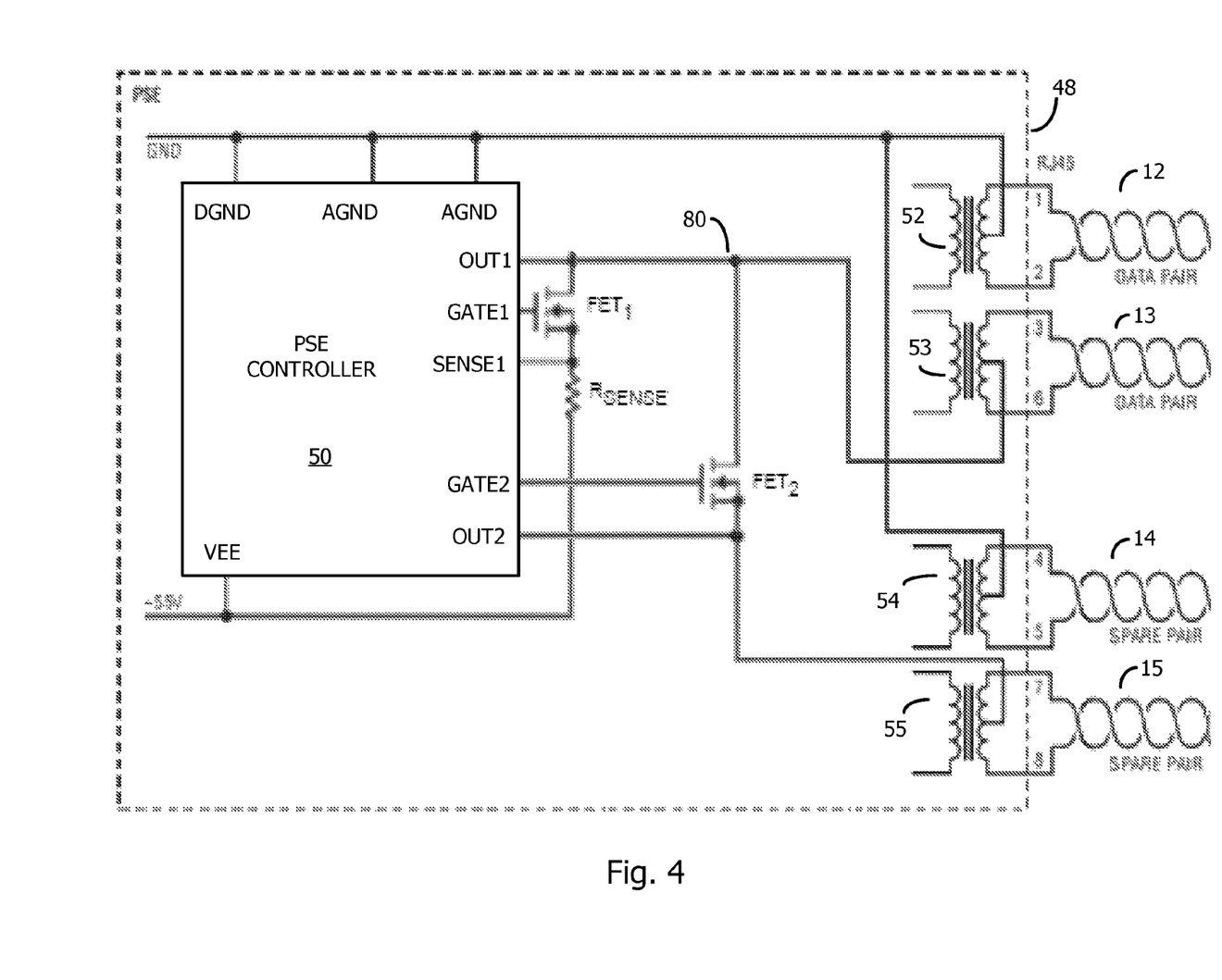
FIG. 4 illustrates one embodiment of an inventive PSE controller and its connection in a PoE system.

The circuits shown in the PSE 48 of FIG. 4 represent the pertinent aspects of a PoE-enabled Ethernet system, where power may be supplied over twisted wire data pairs and spare pairs to PDs. Aspects of such an Ethernet system that are not relevant to the invention, such as devices that communicate operational data over the CAT-5 cable to the PDs, are not shown since they may be conventional. A typical device that may be connected to the data pairs and spare pairs, via their transformers, for communicating differential digital data after powering up is a processor that may control the operation of the PDs. The transformers for the data pairs and spare pairs may be connected to data busses connected to various other devices.

In FIG. 4, the data pairs 12 and 13 and the spare pairs 14 and 15 may be connected to any devices, including the device(s) shown in FIGS. 1 and 2. The PSE controller 50 of FIG. 4 has additional features that allow any types of devices to be connected to the data pairs and spare pairs, while selectively applying a PoE voltage to one or both of the data pairs and spare pairs to avoid damage to the devices.

When power is first applied to the PSE controller 50, by a power supply coupled to the VEE pin and ground pins of the PSE controller 50, the FET1 and the FET2 are in their off states. There is a ground terminal DGND for the digital circuitry within the PSE controller 50 and shared ground terminals AGND for the analog circuitry.

Conventional transformers 52-55 couple the data pairs 12 and 13 and the spare pairs 14 and 15 to, for example, busses (not shown) for data communication during operation after the PDs (or other devices) have been fully powered up. The PSE 48 may comprise a card having terminals that plug into a socket, and the transformer leads connect to the bus via the socket. The socket may also provide the −55 volts and the ground, where the PoE power supply is also considered part of the PSE 48.

Upon the PSE controller 50 powering up when the −55 volts is supplied, a routine is performed by a processor internal to the PSE controller 50. The processing hardware may be conventional and similar to that in the prior art PSE controller of FIG. 2. However, the routine includes the added features described herein. The routines may be stored in a memory or be hardwired in logic circuits, such as state machines.

In the examples provided, the following detection technique is used. Instead of supplying two voltages to the PD over the pairs to detect the characteristic impedance (25K ohms) by measuring the resulting currents, the detection is performed by supplying a known low first current on a set of pairs and detecting the resulting voltage, then changing the current to a known second current and detecting the delta voltage. Since the delta current is also known, the resistance may be determined by Ohms law. The two-point fixed current method allows the PD signature resistance to be isolated from any static diode voltage drops in the PD.

Figure 5:
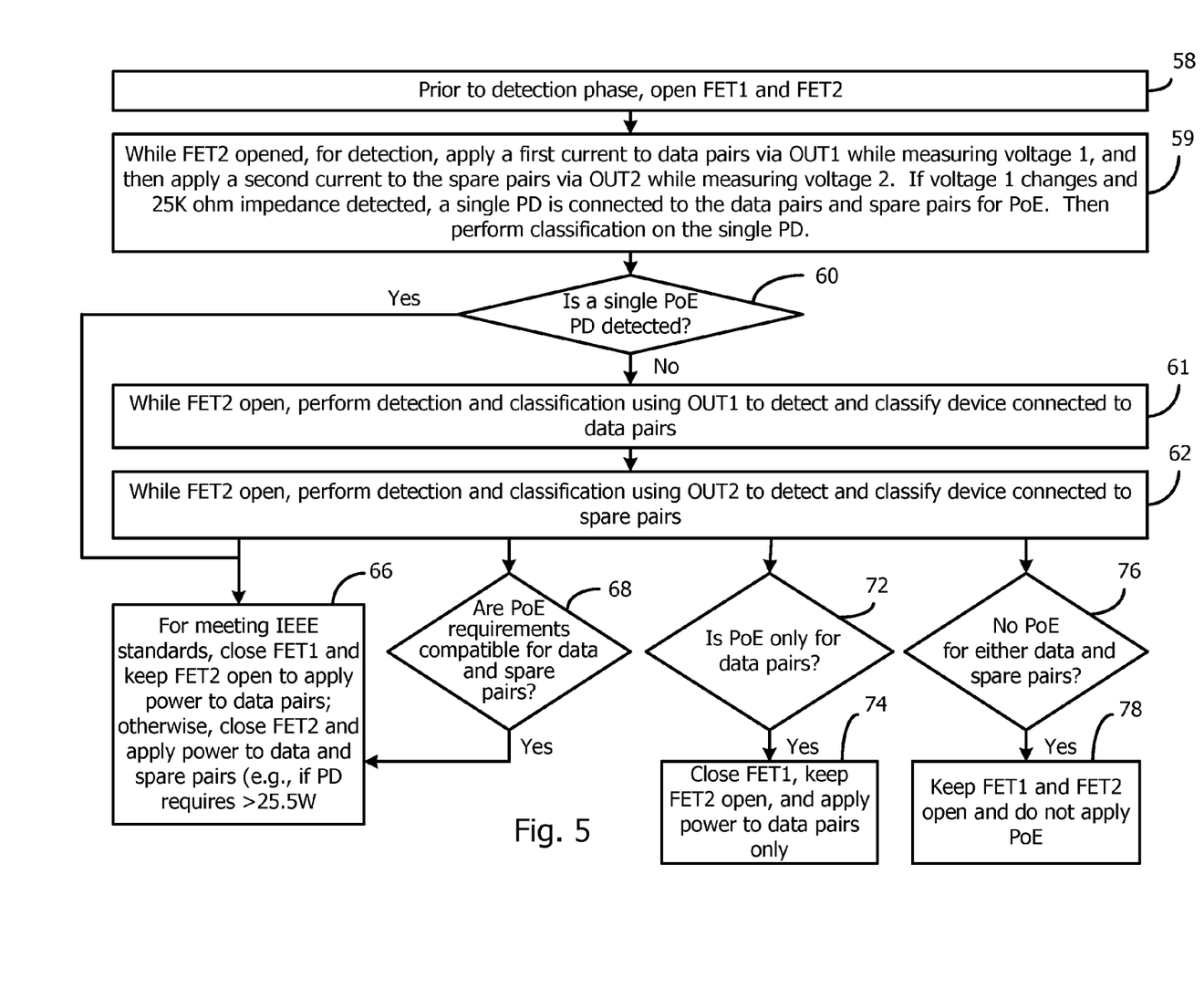
FIG. 5 is a flowchart illustrating some possible scenarios during operation of the PSE controller of FIG. 4.

As shown in the flowchart of FIG. 5, in step 58 the FET1 and FET2 are initially open so no power is applied to the data pairs and spare pairs after the PSE controller 50 is powered up. The FETs are controlled by signals applied to the GATE1 and GATE2 pins. In one embodiment, GATE1 is configured for hot swapping of the PSE controller 50, while GATE2 is not configured for hot swapping.

In step 59, a detection test is performed that simultaneously detects the presence of the 25K ohm resistor in the PD while determining if a single PD is connected to the data pairs and spare pairs for PoE (as shown in FIG. 1). While the FET2 is off, the PSE controller 50 supplies a known first current to the data pairs (via OUT1) and measures the resulting voltage. While the first current is being applied to the data pairs, a known second current is supplied to the spare pairs (via OUT2), and the resulting voltage is detected. If the data pairs and spare pairs are connected at the PD, the current supplied to the spare pairs will add to the current supplied to the data pairs to affect the voltage measured at OUT2. The sum of the currents supplied to the data pairs and spare pairs will flow through any 25K ohm resistor in the PD, used signifying that it is PoE compatible. If the detection of the two voltages at OUT1 and OUT2 at the two current levels indicates that the 25K ohm resistance is present (using Ohms law), it signifies that there is only one PD coupled to the data pairs and the spare pairs and that it is PoE-compatible. The classification phase is then performed for the single PD.

The classification routine is performed at low power (by detecting the response of the PD to various signals) to determine which of, for example, five classes the PD falls under. The classes generally relate to the power needs of the PD, including whether the PD requires greater than the conventional maximum power of 25.5 W. The classification routine may be that specified by the IEEE standards.

If the above detection technique indicates that the data pairs and the spare pairs are not connected to the same PD (step 60), the full detection and classification routines are then independently performed (steps 61 and 62) for the data pairs (via OUT1) and the spare pairs (via OUT2).

In one embodiment, the detection and classification in steps 61 and 62 may be performed concurrently and independently for the data pairs and the spare pairs, or may be performed sequentially. The detection and classification routines may be the same as described with respect to FIG. 1. The IEEE PoE standards for detection and classification are incorporated herein by reference.

After step 62 (or after step 60), the PSE controller 50 now knows whether the data pairs and spare pairs are connected to the same PoE-compatible PD, such as in FIG. 1, or whether the data pairs and spare pairs are connected to different devices where one or both may be PoE compatible, or whether neither of the pairs are connected to a PoE-compatible device.

Various scenarios will now be discussed.

In step 66, if the detection and classification indicate that both the data pairs and the spare pairs are coupled to the same PoE-compatible PD, whether or not the PD is a high power PD (requires >25.5 W), the PSE controller 50 turns on the FET2 to effectively short the data pairs to the spare pairs (ground is always connected). This lowers the resistive losses in the cable. The PSE controller 50 then turns on the FET1 to couple the full PoE voltage of −55 volts to the data pairs and spare pairs, via the low value sense resistor Rsense. Although FETs are shown, any transistor or other type of switch may be used. Now, the PD(s) is fully powered by the PSE 48. However, the IEEE standards currently prohibit the data pairs and the spare pairs to be shorted for PoE, so, alternatively, the FET2 can be kept off to meet the IEEE standards. If the PD indicates during classification that it requires greater than 25.5W, the FET2 should be turned on so the high power is shared by the data and spare pairs to reduce IR drop. Sharing the power by the data and spare pairs may also increase safety for high power applications.

In steps 68 and 66, even if the detection and classification phases in steps 61 and 62 indicate that different PDs are connected to the data pairs and spare pairs, but the classifications are identical or compatible, the FET1 and FET2 are turned on to apply the full PoE voltage to both the data pairs and the spare pairs. However, as described above, the IEEE standards currently prohibit the data pairs and the spare pairs to be shorted for PoE, so, alternatively, the FET2 can be kept off to meet the IEEE standards.

The PSE controller 50 may contain conventional hardware and routines that monitor the current through the Rsense and control FET1 to limit the current or disconnect the PD from the power source. In one embodiment, the PSE controller 50 senses the voltage differential between the VEE pin and the SENSE1 pin to determine the current through Rsense by Ohms law. The PSE controller 50 uses the sense signal to: 1) detect if the PD(s) has become disconnected; 2) detect the actual current through Rsense for reporting purposes; 3) detect an overcurrent situation for reporting purposes; and 4) detect whether the PD has reached a hard-stop current limit, which then limits the current by controlling the conductivity of the FET1. If no current is detected as flowing, indicating that the PD(s) are disconnected, the FET1 is controlled to turn off. The current flags depend on the classification of the PD.

In steps 72 and 74, if the detection and classification phase indicates that only the device connected to the data pairs is PoE compatible, such as shown in FIG. 2, the PSE controller 50 keeps the FET2 off and turns on the FET1 to only apply the PoE voltage to the data pairs. Thus, no damage is done to the non-PSE-compatible device.

In steps 76 and 78, if the detection and classification phase indicates that neither of the devices connected to the data pairs or spare pairs is PoE compatible, the PSE controller 50 keeps the FET1 and the FET2 off so no PoE voltage is supplied to the data pairs and spare pairs.

The selective control of the FET2 maintains backward compliance with IEEE PoE PDs.

In the case where only the device connected to the spare pairs is PoE-compatible, the FET1 and FET2 remain off and neither device will receive the PoE voltage. This is because, in the embodiment of FIG. 4, the spare pairs can only receive the PoE voltage if the data pairs receive the PoE voltage. Therefore, in another embodiment, there is a third FET connected between the node 80 and the data pairs, which is controlled by the PSE controller 50 for isolating the spare pairs from the data pairs when FET1 and FET2 are closed to supply the PoE voltage only to the spare pairs. The third FET would be turned on during the detection and classification phase. Such a configuration may satisfy the IEEE standards. In such a mode, only a single PSE controller is still used for independently controlling PoE to the data pairs and the spare pairs, rather than a separate PSE controller for each of the data pairs and spare pairs, saving cost and space.

The various FETs are controlled by simple drive circuits in response to signals by a processor. The various FETs may be internal to the PSE controller package, along with any of the external wiring shown in FIG. 4, and suitable pins would be provided on the package. The processing hardware internal to the PSE controller 50, including a microprocessor and/or state machines, may be identical to the processing hardware in the prior art PSE controller 27 in FIG. 1, where the routines carried out are modified in accordance with the invention to accommodate the addition of the OUT2 and FET2 control port. Accordingly, a description of the internal circuitry of the PSE controller 50 is not needed for enablement of the invention, and many equivalent types of control circuits may be use. The PSE controller 50 may be formed as a single integrated circuit, or the single package may include multiple integrated circuits connected together.

The terms PSE and PD are used throughout this disclosure to identify equipment that supplies power and equipment that receives the power, and such equipment/devices are not limited to Ethernet equipment/devices unless otherwise specified.

Any of the features described throughout this entire disclosure may be combined.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:
1. A Power over Ethernet (PoE) system comprising:
Power Sourcing Equipment (PSE) selectably connectable to a set of data wire pairs and to a set of spare wire pairs in an Ethernet system for providing a PoE voltage over at least the data wire pairs;
a Powered Device (PD) connected to the PSE by at least the data wire pairs to receive the PoE voltage; and a PSE controller as part of the PSE, the PSE controller comprising:
    a first output port (OUT1);
    a second output port (OUT2);
    a first switch control port coupled to a first switch, the first switch selectively coupling the PoE voltage to the data wire pairs;
    a second switch control port coupled to a second switch, the second switch selectively coupling the OUT1 to the OUT2; and
    processing circuitry configured for performing the method comprising:
        keeping the first switch and the second switch off during a detection and classification routine, performed via the OUT1 and the OUT2;
        performing the detection and classification routine to determine if the PoE voltage should be applied to both the data wire pairs and the spare wire pairs, or to only the data wire pairs, or to neither the data wires pairs or the spare pairs;
        keeping the second switch off while turning on the first switch to supply the PoE voltage to only the data wire pairs if it is determined that the PoE voltage should only be provided to the data wire pairs; and
        turning on the second switch and the first switch to supply the PoE voltage to both the data wire pairs and the spare wire pairs if it is determined that the PoE voltage should be provided to both the data wire pairs and the spare wire pairs.

2. The system of claim 1 wherein the processing circuitry is configured to perform the detection method comprising:
    applying a first current to the OUT1 and measuring a resulting first voltage;
    applying a second current to the OUT2 and measuring a resulting second voltage;
    determining an impedance at the PD indicative that the PD is PoE-compatible; and
    detecting that the second current is added to the first current to determine that the data wire pairs and the spare wire pairs are connected to the same PD.

3. The system of claim 1 wherein the processing circuitry is configured to perform the detection method comprising:
    applying a signal to the OUT1 to determine whether the PD coupled to the data wire pairs is PoE-compatible; and
    applying another signal to the OUT2 to determine whether a device coupled to the spare wire pairs is PoE-compatible.

4. The system of claim 1 wherein the processing circuitry is configured to turn on the first switch and the second switch after it is determined that the PD is coupled to both the data wire pairs and the spare wire pairs and requires a particular power level.

5. The system of claim 1 wherein the processing circuitry is configured to perform a current sensing method comprising:
    detecting a current flowing through the first switch after the first switch is turned on to conduct current to at least the data wire pairs; and
    controlling the first switch to prevent the current from exceeding a certain level.

6. The system of claim 1 further comprising transformers coupling the PoE voltage to at least the data wire pairs, wherein the PoE voltage is coupled to a center tap of the transformers when the first switch is turned on.

7. A Power Sourcing Equipment (PSE) controller, for use in a Power over Ethernet (PoE) system, comprising:
    a first output port (OUT1) for being coupled to data wire pairs;
    a second output port (OUT2) for being coupled to spare wire pairs;
    a first switch control port configured to supply a first control voltage to a first switch that selectively couples a PoE voltage to the data wire pairs;
    a second switch control port configured to supply a second control voltage to a second switch that selectively couples the OUT1 to the OUT2; and
    processing circuitry configured for performing the method comprising:
        keeping the first switch and the second switch off during a detection and classification routine, performed via the OUT1 and the OUT2;
        performing the detection and classification routine to determine if the PoE voltage should be applied to both the data wire pairs and the spare wire pairs, or to only the data wire pairs, or to neither the data wires pairs or the spare pairs;
        keeping the second switch off while turning on the first switch to supply the PoE voltage to only the data wire pairs if it is determined that the PoE voltage should only be provided to the data wire pairs; and
        turning on the second switch and the first switch to supply the PoE voltage to both the data wire pairs and the spare wire pairs if it is determined that the PoE voltage should be provided to both the data wire pairs and the spare wire pairs.

8. The controller of claim 7 wherein the processing circuitry is configured to perform the detection method comprising:
    applying a first current to the OUT1 and measuring a resulting first voltage;
    applying a second current to the OUT2 and measuring a resulting second voltage;
    determining an impedance at a Powered Device (PD), connected to at least the data wire pairs, indicative that the PD is PoE compatible; and
    detecting that the second current is added to the first current to determine that the data wire pairs and the spare wire pairs are connected to the same PD.

9. The controller of claim 7 wherein the processing circuitry is configured to perform the detection method comprising:
    applying a signal to the OUT1 to determine whether a Powered Device (PD), connected to at least the data wire pairs is PoE-compatible; and
    applying another signal to the OUT2 to determine whether a device coupled to the spare wire pairs is PoE-compatible.

10. The controller of claim 7 wherein the processing circuitry is configured to turn on the first switch and the second switch after it is determined that a Powered Device (PD), connected to the at least the data wire pairs, is coupled to both the data wire pairs and the spare wire pairs and requires a particular power level.

11. The controller of claim 7 wherein the processing circuitry is configured to perform a current sensing method comprising:
    detecting a current flowing through the first switch after the first switch is turned on to conduct current to at least the data wire pairs; and
    controlling the first switch to prevent the current from exceeding a certain level.

12. A method performed by a Power Sourcing Equipment (PSE) controller, connected in a Power over Ethernet (PoE)

system, the PSE controller comprising a first output port (OUT1) coupled to data wire pairs, a second output port (OUT2) coupled to spare wire pairs, a first switch control port for supplying a first control voltage to a first switch that selectively couples a PoE voltage to the data wire pairs, a second switch control port for supplying a second control voltage to a second switch that selectively couples the OUT1 to the OUT2, and processing circuitry configured to control signals at the OUT1, OUT2, first switch control port, and second switch control port, the method comprising:
- keeping the first switch and the second switch off during a detection and classification routine, performed via the OUT1 and the OUT2;
- performing the detection and classification routine to determine if the PoE voltage should be applied to both the data wire pairs and the spare wire pairs, or to only the data wire pairs, or to neither the data wires pairs or the spare pairs;
- keeping the second switch off while turning on the first switch to supply the PoE voltage to only the data wire pairs if it is determined that the PoE voltage should only be provided to the data wire pairs; and
- turning on the second switch and the first switch to supply the PoE voltage to both the data wire pairs and the spare wire pairs if it is determined that the PoE voltage should be provided to both the data wire pairs and the spare wire pairs.

13. The method of claim 12 further comprising performing the detection method comprising:
- applying a first current to the OUT1 and measuring a resulting first voltage;
- applying a second current to the OUT2 and measuring a resulting second voltage;
- determining that an impedance at a Powered Device (PD), connected to the at least the data wire pairs, is indicative that the PD is PoE compatible; and
- detecting that the second current is added to the first current to determine that the data wire pairs and the spare wire pairs are connected to the same PD.

14. The method of claim 12 further comprising performing the detection method comprising:
- applying a signal to the OUT1 to determine whether a Powered Device (PD), connected to at least the data wire pairs, is PoE-compatible; and
- applying another signal to the OUT2 to determine whether a device coupled to the spare wire pairs is PoE-compatible.

15. The method of claim 12 further comprising turning on the first switch and the second switch after it is determined that a Powered Device (PD), connected to at least the data wire pairs, is coupled to both the data wire pairs and the spare wire pairs and requires a particular power level.

16. The method of claim 12 further comprising a current sensing method comprising:
- detecting a current flowing through the first switch after the first switch is turned on to conduct current to at least the data wire pairs; and
- controlling the first switch to prevent the current from exceeding a certain level.

17. The method of claim 12 wherein transformers couple the PoE voltage to at least the data wire pairs, wherein the PoE voltage is coupled to a center tap of the transformers when the first switch is turned on.

* * * * *